(12) United States Patent
Sumida et al.

(10) Patent No.: US 12,051,526 B2
(45) Date of Patent: Jul. 30, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Shintaro Sumida, Mie (JP); Motohiro Yokoi, Mie (JP); Kenta Ito, Mie (JP); Suguru Yasuda, Mie (JP); Tetsuya Nishimura, Mie (JP); Hitomi Harada, Mie (JP); Haruka Nakano, Mie (JP); Ryusuke Kudo, Mie (JP); Hiroki Hirai, Mie (JP); Housei Mizuno, Mie (JP); Hidetoshi Ishida, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 179 days.

(21) Appl. No.: 17/609,528

(22) PCT Filed: May 8, 2020

(86) PCT No.: PCT/JP2020/018634
§ 371 (c)(1),
(2) Date: Nov. 8, 2021

(87) PCT Pub. No.: WO2020/241200
PCT Pub. Date: Dec. 3, 2020

(65) Prior Publication Data
US 2022/0215984 A1    Jul. 7, 2022

(30) Foreign Application Priority Data

May 29, 2019 (JP) ................... 2019-100564

(51) Int. Cl.
*H01B 7/08* (2006.01)

(52) U.S. Cl.
CPC .................. *H01B 7/0823* (2013.01)

(58) Field of Classification Search
CPC ........................................ H01B 7/08
See application file for complete search history.

(56) References Cited

U.S. PATENT DOCUMENTS 3,663,739 A * 5/1972 Chevrier .................. H01B 7/08
174/32
3,833,755 A * 9/1974 Soelberg .................. H01B 7/38
174/117 F (Continued)

FOREIGN PATENT DOCUMENTS

CN          2142221       9/1993
CN        201247619       5/2009

(Continued)

OTHER PUBLICATIONS

Japanese Office Action, Japanese Application No. 2019-100564, issued Sep. 13, 2022, English translation.

(Continued)

*Primary Examiner* — Chau N Nguyen
(74) *Attorney, Agent, or Firm* — GREENBLUM & BERNSTEIN, P.L.C.

(57) ABSTRACT

A wiring member includes: a plurality of wire-like transmission members; and a sheet to which the plurality of wire-like transmission members arranged side by side are fixed, wherein the sheet includes a first sheet covering the plurality of wire-like transmission members from one side and a second sheet covering the plurality of wire-like transmission members from another side, and a planar surface region part is provided on an outer side of the second sheet.

8 Claims, 4 Drawing Sheets

(56) References Cited

U.S. PATENT DOCUMENTS

| | | | | | |
|---|---|---|---|---|---|
| 3,900,654 | A | * | 8/1975 | Stinger | B32B 27/00 |
| | | | | | 428/428 |
| 4,398,084 | A | * | 8/1983 | Walty | H05B 3/06 |
| | | | | | 264/105 |
| 4,988,835 | A | * | 1/1991 | Shah | H01B 7/0838 |
| | | | | | 174/120 SR |
| 5,925,275 | A | * | 7/1999 | Lawson | B64D 15/12 |
| | | | | | 219/543 |
| 7,268,293 | B2 | * | 9/2007 | Smith | H02K 3/30 |
| | | | | | 174/120 C |
| 7,807,927 | B2 | * | 10/2010 | Yeh | H01B 7/0838 |
| | | | | | 174/117 FF |
| 10,867,721 | B2 | | 12/2020 | Ishida et al. | |
| 11,217,364 | B2 | * | 1/2022 | Tomizawa | H01B 7/184 |
| 2003/0196828 | A1 | * | 10/2003 | Schilson | B29C 66/8165 |
| | | | | | 174/117 F |
| 2006/0157267 | A1 | * | 7/2006 | Morijiri | H01B 11/203 |
| | | | | | 174/117 F |
| 2020/0324718 | A1 | * | 10/2020 | Bilas | H01R 12/61 |

FOREIGN PATENT DOCUMENTS

| | | | |
|---|---|---|---|
| CN | 107492861 | | 12/2017 |
| JP | 02-098013 | * | 4/1990 |
| JP | 2001-291446 | | 10/2001 |
| JP | 2002-218634 | | 8/2002 |
| JP | 2003-158150 | | 5/2003 |
| JP | 2004-192913 | | 7/2004 |
| JP | 2007-165135 | | 6/2007 |
| JP | 2018-137208 | | 8/2018 |

OTHER PUBLICATIONS

International Preliminary Report on Patentability, WIPO, issued in International Pat. Appl. No. PCT/JP2020/018634, dated Dec. 9, 2021, along with an English translation thereof.

International Search Report, WIPO, issued in International Pat. Appl. No. PCT/JP2020/018634, dated Jul. 28, 2020, along with an English translation thereof.

China Office Action received in CN Application No. 202080038248.0, dated Sep. 14, 2023.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that a flat wiring member such as a wire harness described in Patent Document 1 is held by a vacuum suction and transported.

Thus, an object is to provide a wiring member which can be easily held by a vacuum suction.

Means to Solve the Problem

A wiring member according to the present disclosure is a wiring member including: a plurality of wire-like transmission members; and a sheet to which the plurality of wire-like transmission members arranged side by side are fixed, wherein the sheet includes u first sheet covering the plurality of wire-like transmission members from one side and a second sheet covering the plurality of wire-like transmission members from another side, and a planar surface region part is provided on an outer side of the second sheet.

Effects of the Invention

According to the present disclosure, the wiring member is easily held by a vacuum suction,

DESCRIPTION OF EMBODIMENT(S)

Description of Embodiment of Present Disclosure

Embodiments of the present disclosure are listed and described firstly,

A wiring member according to the present disclosure is as follows.

(1) A wiring member includes: a plurality of wire-like transmission members; and a sheet to which the plurality of wire-like transmission members arranged side by side are fixed, wherein the sheet includes a first sheet covering the plurality of wire-like transmission members from one side and a second sheet covering the plurality of wire-like transmission members from another side, and a planar surface region part is provided on an outer side of the second sheet. Accordingly, when a vacuum suction pad is applied to a planar surface region part, the planar surface region part and the vacuum suction pad are firmly attached to each other in an airtight state easily. Accordingly, an air leakage is suppressed at a time of the vacuum suction, thus the wiring member is easily held by the vacuum suction. It is sufficient that the vacuum in the vacuum suction in the present specification is negative with respect to an atmospheric pressure as with a normal vacuum suction, thus needs not be vacuum in a strict sense.

(2) it is also applicable that the second sheet is formed to be harder than the first sheet, a depression is formed on an outer surface of the second sheet, and a bottom surface of the depression forms the planar surface region part. Accordingly, even when the second sheet is bended, the planar surface region part is provided.

(3) The wiring member may further include a plate-like material provided on an outer surface of the second sheet, wherein an outer surface of the plate-like material forms the planar surface region part. Accordingly, the planar surface region part is easily kept in a planar state.

(4) The plate-like material may be formed to be harder titan the second sheet. Accordingly, even when the second sheet is bended, the planar surface region part is provided.

(5) The plurality of wire-like transmission members located on an inner side of the planar surface region part may have an identical outer diameter. Accordingly, the second sheet is hardly bended.

(6) A surface roughness of the planar surface region part may be smaller than a surface roughness of a part of the second sheet where the planar surface region part is not located. Accordingly, the planar surface region part and the vacuum suction pad are firmly attached to each other in an airtight state easily.

(7) The planar surface region part may be provided in a position exposed in the wiring member in a folded state. Accordingly, the vacuum suction pad can be applied to the planar surface region part in a state where the wiring member is folded, and the wiring member can be transported in a state of being folded.

Details of Embodiment of Present Disclosure

Specific examples of a wiring member of the present disclosure are described hereinafter with reference to the drawings. The present invention is not limited to these examples, but is indicated by claims, and it is intended that meanings equivalent to claims and all modifications within a scope of claims are included.

Embodiment 1

Figure 1:
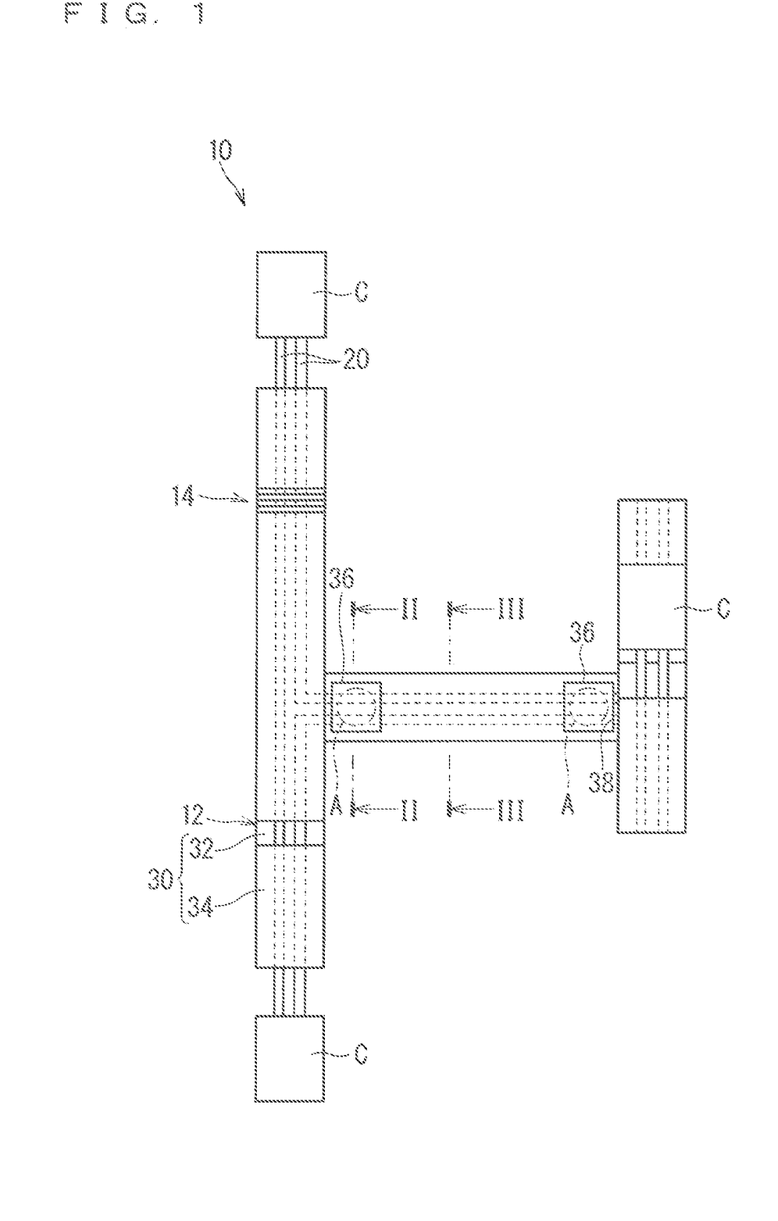
FIG. 1 is a plan view illustrating a wiring member according to an embodiment 1.
Figure 2:
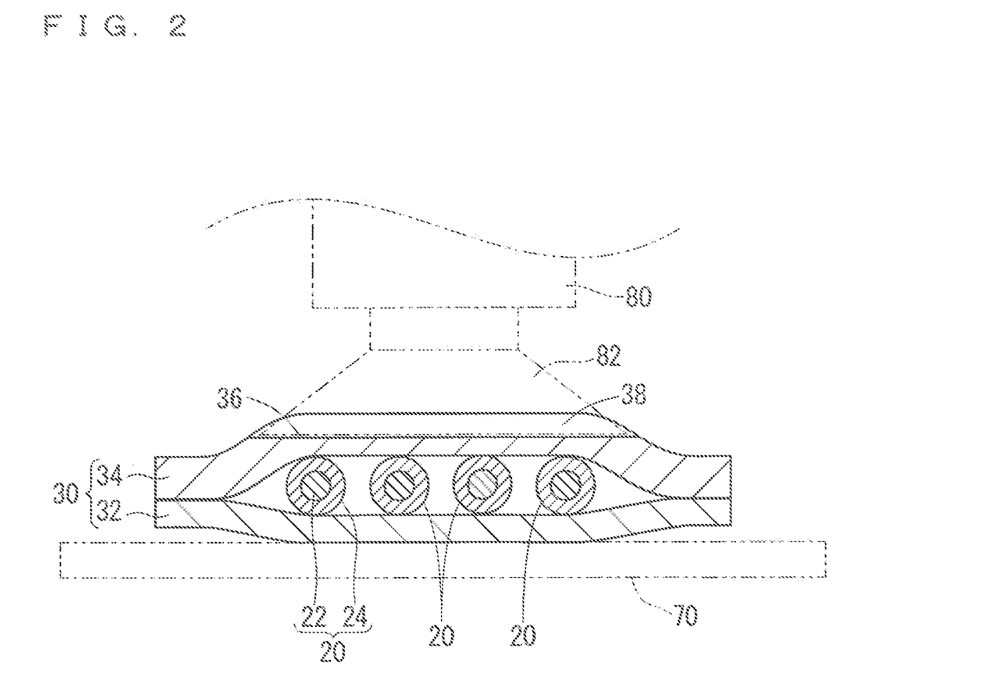
FIG. 2 is a cross-sectional view along a II-II line in FIG. 1.
Figure 3:
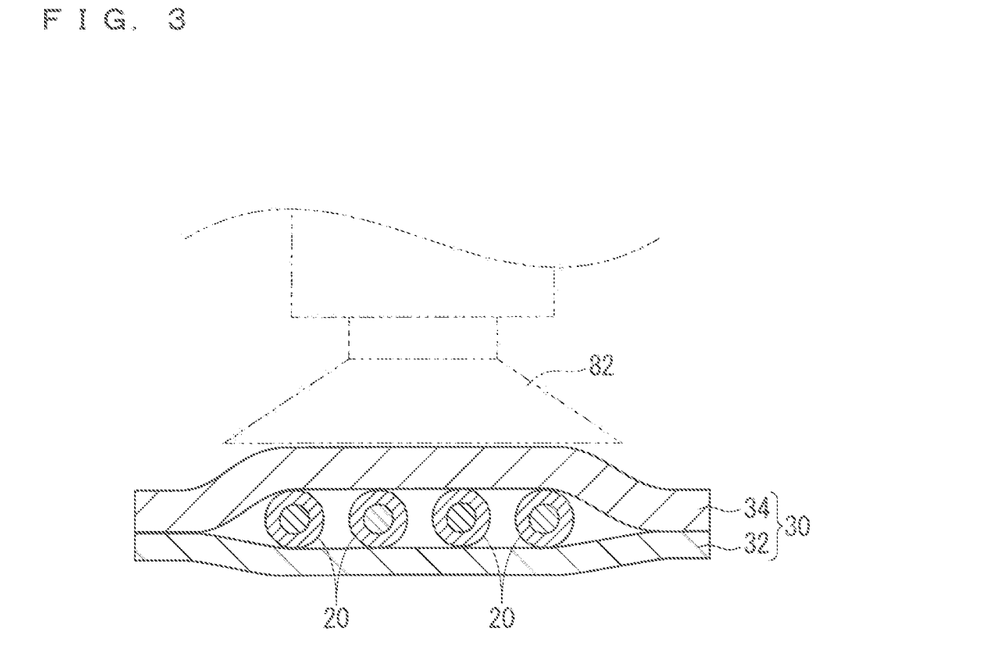
FIG. 3 is a cross-sectional view along at III-III line in FIG. 1.

A wiring member according to an embodiment 1 is described hereinafter. FIG. 1 is a plan view illustrating a wiring member 10 according to the embodiment 1. FIG. 2 is a cross-sectional view along a II-II line in FIG. 1. FIG. 3 is a cross-sectional view along a III-III line in FIG. 1. In FIG. 1, a terminal portion on a left side indicates a state before the wiring member 10 is folded, and a terminal portion on a right side indicates a state after the wiring member 10 is folded. When the terminal portion on the right side is developed, it will be the same as the terminal portion on the left side. When the terminal portion on the left side is folded, it will he the same as the terminal portion on the right side. The wiring member 10 is normally transported to an assembly operation position to be assembled to a vehicle in a folded state, developed in the assembly operation position, and assembled to the vehicle. In the description, at this time, the wiring member 10 is sucked by a vacuum suction pad 82 provided on a tip end of a robot arm 80, for example, and raised to be transported in a state of being folded and disposed on a table 70.

The wiring member 10 is wholly formed into a flat state. The wiring member 10 includes a plurality of wire-like transmission members 20 and a sheet 30.

It is sufficient that the wire-like transmission member 20 is a wire-like member transmitting an electrical power or light, for example. For example, the wire-like transmission member 20 be a general wire having a core wire and a covering around the care wire, or may also be a bare conductive wire, a shielded wire, an enamel wire, a nichrome wire, or an optical fiber.

The wire-like transmission member 20 transmitting the electrical power may be various kinds of signal lines or various kinds of power lines. The wire-like transmission member 20 transmitting the electrical power may be used as an antenna or coil, for example, transmitting or receiving a signal or electrical power to or from a space.

The wire-like transmission member 20 includes a transmission wire body transmitting an electrical power or light and a covering for covering the transmission wire body. When the wire-like transmission member 20 is a general wire, the transmission wire body is a core wire 22, and the covering is an insulating covering 24. The core wire 22 may be made up of a plurality of single wires. The plurality of single wires may be stranded. In the example illustrated in FIG. 2, the plurality of wire-like transmission members 20 having the same diameter and structure are disposed on one sheet 30, however, it is sufficient that the diameter and the structure of each of the plurality of wire-like transmission members 20 are appropriately set, thus the wire-like transmission members 20 each having a different diameter and a structure, for example, may be disposed on the same sheet 30.

The wire-like transmission member 20 may be a single wire-like object or a composite object of a plurality of wire-like objects (a twisted wire and a cable made up of a plurality of wire-like objects covered by a sheath). A terminal and a connector C, for example, arc appropriately provided in accordance with a connection state of the wire-like transmission member 20 and the other side member in an end portion of the wire-like transmission member 20.

In the example illustrated in FIG. 1, the plurality of wire-like transmission members 20 extend along a H-shaped route on the sheet 30. The wiring member 10 is thereby provided with four terminal portions. Needless to say, the route of the plurality of wire-like transmission members 20 is not limited thereto. It is sufficient that the plurality wire-like transmission members 20 are wired in a state of following a route in a vehicle on the sheet 30. The plurality of wire-like transmission members 20 are wired in the state of following the route in the vehicle on the sheet 30, thus the route of the plurality of wire-like transmission members 20 is regulated, and the plurality of wire-like transmission members 20 can be assembled to the vehicle easily. In the description hereinafter, in a part of the wiring member 10, a direction along a longitudinal direction of the wire-like transmission member 20 is simply referred to as a longitudinal direction, and a direction along a direction in which the plurality of wire-like transmission members 20 are arranged is simply referred to as a parallel direction.

The plurality of wire-like transmission members 20 arranged side by side are fixed to the sheet 30. The sheet 30 keeps a wiring state of the wire-like transmission members 20. The sheet 30 includes a first sheet 32 and a second sheet 34. The first sheet 32 covers the plurality of wire-like transmission members 20 from one side. The second sheet 34 covers the plurality of wire-like transmission members 20 from the other side (a side opposite to the first sheet 32). An intermediate portion in the wire-like transmission member 20 is surrounded by the first sheet 32 and the second sheet 34. Accordingly, suppressed is an exposure of the intermediate portion in the wire-like transmission member 20, The sheet 30 is formed into a shape along a route of the plurality of wire-like transmission members 20. A band-like portion extends along the route of the plurality of wire-like transmission members 20 to form the sheet 30. A width dimension of the band-like portion is larger than. an interval between the wire-like transmission member 20 on a side of one side portion along the parallel direction and the wire-like transmission member 20 on a side of the other side portion.

Herein, the wire-like transmission member 20 is fixed to only the first sheet 22 in the first sheet 32 and the second sheet 34. A fixing state of the wire-like transmission member 20 and the fist sheet 32 is not particularly limited, however, bonding or welding may also be applied. The bonding indicates that two members are bonded to each other via an inclusion such as an adhesive agent or a double-sided adhesive tape. The welding indicates that resin contained in at least one of two members are melted and the two members are welded to each other without an intervention of an inclusion. Herein, at least one of resin contained in the insulating covering 24 of the wire-like transmission member 20 and resin contained in the first sheet 32 is melted and bonded to the other side member, thus the wire-like transmission member 20 and the first sheet 32 are fixed to each other.

Materials constituting the first sheet 32 and the second sheet 34 are not particularly limited, however, the first sheet 32 and second sheet 34 are formed of materials containing resin of polyvinyl chloride (PVC), polyethylene terephthalate (PET), polypropylene (PP), or nylon, for example. The first sheet 32 and the second sheet 34 may be a fibrous material having fiber such as a non-woven cloth, a woven fabric, or a knitting fabric or a non-fiber material, for example. The non-fiber material may be a solid member with an inner portion evenly filled or a foam made up by foam molded resin. The first sheet 32 and the second sheet 34 may contain a material such as metal, for example.

The first sheet 32 and the second sheet 34 may be a single layer or may be a plurality of stacked layers. When the first sheet 32 and the second sheet 34 are made up of the plurality of stacked layers, it is considered that a resin layer and a resin layer are stacked, for example. It is also considered that a resin layer and a metal layer are slacked, for example. The first sheet 32 and the second sheet 34 may be made up of a non-fiber material layer and a non-fiber material layer overlapped with each other, a non-fiber material layer and a fiber material layer overlapped with each other, or a fiber material layer and a fiber material layer overlapped with each other.

The first sheet 32 has a double-layered structure, for example. A first layer in the first sheet 32 is a layer appropriate for fixation to the wire-like transmission member 20. For example, the first layer is formed into a solid member, with an inner portion evenly filled, of the same material as that of the insulating covering 24 of the wire-like transmission member 20. The wire-like transmission member 20 is fixed on the first layer. The second layer is a layer enhancing a function of the sheet 30. The second layer is a non-woven cloth, for example. The first layer may be wholly or partially provided on the second layer. For example, the first layer may be provided only in an intermediate portion along a width direction of the second layer (a parallel direction of the wire-like transmission member 20), and needs not he provided in a side edge portion. For example, the first layer may be provided at intervals along the longitudinal direction of the second layer (the longitudinal direction of the wire-like transmission member 20). The first sheet 32 is easily bended. The first sheet 32 is soft enough to be able to follow bending of the wire-like transmission member 20 when the wiring member 10 is folded.

The second sheet 34 has a single-layered. structure, for example. The second sheet 34 has higher rigidity than the first sheet 32. The second sheet 34 is a solid member of nylon as a material with an inner portion evenly filled, for example. The wire-like transmission member 20 is not fixed to the second sheet 34. An edge portion of the second sheet 34 is fixed to the first sheet 32. A fixing state of the first sheet 32 and the second sheet 34 is not particularly limited, however, welding or bonding is also applicable. The second sheet 34 may be fixed to the first layer or the second layer in the first sheet 32.

The wiring member 10 is provided with easy-bending parts 12 and 14. The easy-bending parts 12 and 14 are provided in a region where the sheet 30 is located. The easy-bending part 12 is a part where the second sheet 34 is provided at intervals along the longitudinal direction of the wire-like transmission member 20. That is to say, the easy-bending part 12 is a part where the second sheet 34 is not located along the longitudinal direction of the wire-like transmission member 20. Described above is the configuration that the second sheet 34 is not included, however, the configuration is not limited thereto. For example, it is sufficient that rigidity of the second sheet in a position corresponding to the easy-bending part is set to be lower than the second sheet in a region except for the easy-bending part. That is to say, the easy-bending part 14 is a part formed into a shape capable of partially bending the second sheet 34 easily. In the example illustrated in FIG. 1, an accordion-like part is formed as the shape capable of bending the second sheet 34 easily. The accordion-like part is a part formed into an accordion-like shape in which a mountain and a valley are alternately and sequentially loaned in the longitudinal direction of the wire-like transmission member 20. When a part on a terminal portion side is bended at positions of the easy-bending parts 12 and 14, the wiring member 10 is folded.

One example of the easy-bending part is described above, however, it is sufficient that the easy-bending part has a shape of being partially bended easily such as a fold line (not shown), for example, thus the shape thereof is not particularly limited. Also applicable is a shape in which a slit (not shown) is provided not in the second sheet, but in tire first sheet to form the easy-bending part.

A vacuum suction position is set in the wiring member 10. In the example illustrated in FIG. 1, a region A illustrated by a dashed-two dotted line is the vacuum suction position. In the example illustrated in FIG. 1, two vacuum suction positions are set. The vacuum suction position is set in a position where the wiring member 10 is hardly inclined when the wiring member 10 is vacuum-sucked at the position and raised and can substantially maintain balance. The number of vacuum suction positions in one wiring member 10 is not limited to two. For example, when the wiring member 10 is relatively small, one vacuum suction position may be provided. For example, when the wiring member 10 is relatively large, three or more vacuum suction positions may he provided. When the wiring member 10 is folded, it is sufficient that the vacuum suction position is provided in a position exposed in the wiring member 10 in a folded state. The vacuum suction is described as the suction configuration for convenience, however, it is obvious that the suction configuration is not limited to the vacuum suction. It is sufficient that negative pressure large enough to suck and raise the wiring member 10 is applied.

A planar surface region part 36 is provided on an outer side of the second sheet 34. The planar surface region part 36 preferably has a smaller surface roughness than a part of the second sheet 34 which is not the planar surface region part 36. The planar surface region part 36 has a small surface roughness, thus air leakage hardly occurs when the vacuum suction pad 82 is applied to the planar surface region part 36. The surface roughness can be measured with a contact-type (stylus) surface roughness tester, for example. In this case, an arithmetic average of measurement values measured ten times for each sample can he set to a surface roughness of each sample based on JIS B 0633:2001 standard, for example. A commercially available surface roughness tester (for example, Form Talysurf PGI 430 manufactured by AMETEK, Inc.) can he used as the surface roughness tester. The planar surface region part 36 is provided in the vacuum suction position. Herein, a depression 38 is formed on an outer surface of the second sheet 34. A bottom surface of the depression 38 forms the planar surface region part 36.

In the second sheet 34, a level difference occurs in the outer surface at least in a portion where the depression 38 is not located. The level difference may occur by fixing the first sheet 32 and the second sheet 34. The level difference may also occur by a difference in outer diameter of the plurality of wire-like transmission members 20. The depression 38 is formed to eliminate the level difference in a portion to be the planar surface region part 36.

The depression 38 is formed to have a groove-like shape extending along the parallel direction. There is a sidewall part extending along the parallel direction and directed to the longitudinal direction on an edge of the depression 38. There is no sidewall part extending along the longitudinal direction on the edge of the depression 38.

The second sheet 34 has a thickness in which the depression 38 can be formed. Even when the depression 38 is formed in the second sheet 34, a portion covering the plurality of wire-like transmission members 20 remains in the second sheet 34. A depth dimension of the depression 38 is set in accordance with a dimension along parallel in planar surface region part 36 is set to a dimension in accordance with the vacuum suction pad 82.

A part of the wiring member 10 where the planar surface region part 36 described above is provided is defined as a first region part. A part of the wiring member 10 adjacent to the first region part is defined as a second region part. The second region part is a region where the sheet 30 is located. That is to say, the first region part and the second region part are regions adjacent to each other in a region in the wiring member 10 where the sheet 30 is located. For example, the second region part is a part illustrated in FIG. 3. The planar surface region part 36 is not provided in the second region part. The outer surface of the second sheet 34 is a planar surface also in the second region part. Even in this case, a region of the planar surface region part 36 in the first region part is larger than a planar surface region in the second region part when seen along the parallel direction. The second region part rosy not include a planar surface.

The plurality of wire-like transmission members 20 located on an inner side of the planar surface region part 36 have the identical outer diameter. Accordingly, a part of a material of the second sheet 34 covering the plurality of wire-like transmission members 20 in a position of the planar surface region part 36 tends to be wholly a planar surface. Accordingly, increase in depth dimension of the depression 38 can he suppressed. Accordingly, increase in thickness dimension of the material of the second. sheet 34 can he suppressed.

<Operation Etc.>

When the vacuum suction pad 82 is applied to the planar surface region part 36, the vacuum suction pad 82 has contact with the planar surface region part 36 as illustrated in FIG. 2. At this time, suppressed is a protrusion of the vacuum suction pad 82 from the planar surface region part 36 also in the parallel direction. Accordingly, the planar surface region part 36 and the vacuum suction pad 82 are firmly attached to each other in an airtight state easily, and an air leakage (vacuum leakage) at the time of the vacuum suction is suppressed.

In the meanwhile, when the vacuum suction pad 82 is applied to a portion which is not the planar surface region part 36, the vacuum suction pad 82 has contact with the outer surface of the second sheet 34 as illustrated in FIG. 3. At this time, the vacuum suction pad 82 may he applied to a level difference portion in the outer surface of the second sheet 34 and protrude from the planar surface in the parallel direction in some cases. In this case, the outer surface of the second sheet 34 and the vacuum suction pad 82 are hardly attached to each other in an airtight state, and an air leakage (vacuum leakage) at the time of the vacuum suction may occur in some cases.

<Effect Etc. of Embodiment 1>

In the wiring member 10, when the vacuum suction pad 82 is applied to the planar surface region part 36, the planar surface region part 36 and the vacuum suction pad 82 are firmly attached to each other in an airtight state easily. Accordingly, the air leakage at the time of vacuum suction is suppressed. Accordingly, the wiring member 10 can be vacuum-sucked with small vacuum pressure, and the wiring member 10 is easily held by a vacuum suction.

The bottom surface of the depression 38 forms the planar surface region part 36, thus even when the second sheet 34 is bended, the planar surface region part 36 is provided.

The plurality of wire-like transmission members 20 located on the inner side of the planar surface region pan 36 have the identical outer diameter, thus the second sheet 34 is hardly bended.

The surface roughness of the planar surface region part 36 Is formed to be smaller than that of the part of the second sheet 34 which is not the planar surface region part 36. Accordingly, the air leakage hardly occurs when the vacuum suction pad 82 is applied to the planar surface region part 36. Accordingly, the planar surface region part 36 and the vacuum suction pad 82 are firmly attached to each other in an airtight state easily.

The planar surface region part 36 is provided in a position exposed in the wiring member 10 in a folded state. Accordingly, the vacuum suction pad 82 can be applied to the planar surface region part 36 in the state where the wiring member 10 is folded, and the wiring member 10 can be transported in the state of being folded.

Embodiment 2

Figure 4:
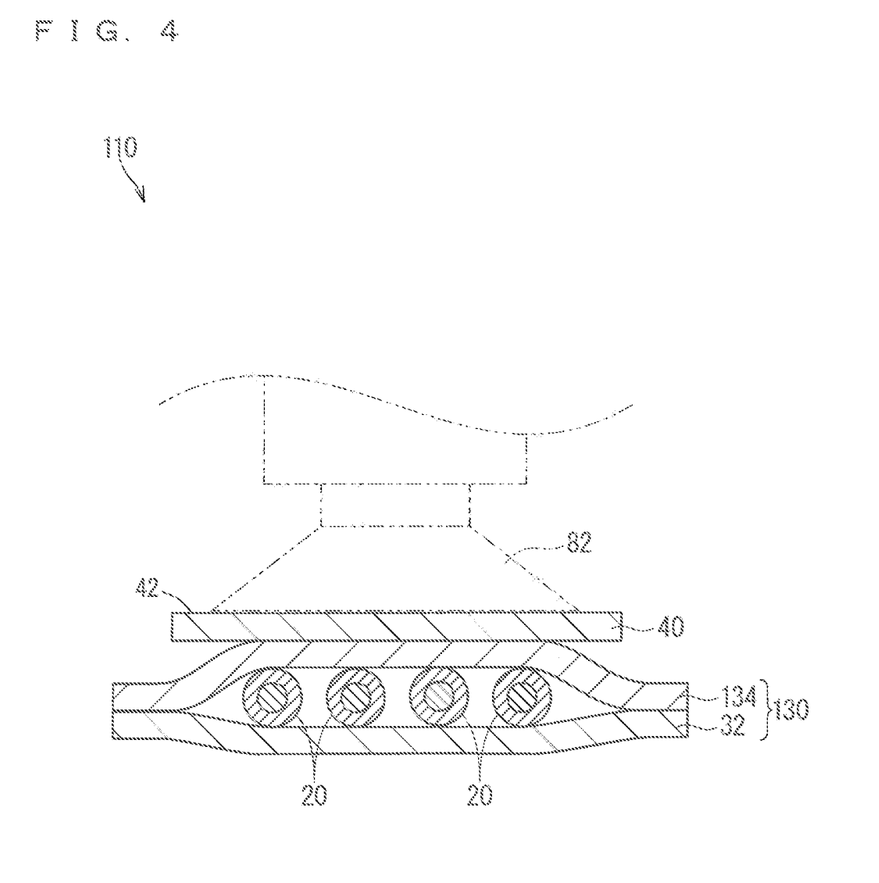
FIG. 4 is a cross-sectional view illustrating a wiring member according to an embodiment 2.

A wiring member according to an embodiment 2 is described. FIG. 4 is a cross-sectional plan view illustrating a wiring member 110 according to the embodiment 2. In the description of the present embodiment, the same reference numerals are assigned to the similar constituent elements described above, and the description thereof will be omitted.

In the wiring member 110, the sheet 130 includes the first sheet 32 and a second sheet 134, The depression 38 is not formed in an outer surface of the second sheet 134. The second sheet 134 has a uniform thickness dimension. In the wiring member 110, the outer surface of the second sheet 134 is not a planar surface region part. The wiring member 110 further includes a plate-like material 40 provided on the outer surface of the second sheet 134. An outer surface of the plate-like material 40 forms the planar surface region part 42.

The plate-like material 40 is formed into a plate-like shape. A shape of the plate-like material 40 in a plan view is not particularly limited, however, polygonal shape or a circular shape is also applicable. A first main surface and a second main surface of the plate-like material 40 are planar surfaces. A first main surface of the plate-like material 40 is directed to a side of the second sheet 134. At least a part of the first main surface of the plate-like material 40 is fixed to the second sheet 134. The second main surface of the plate-like material 40 is an outer surface forming the planar surface region part 42.

A dimension of the plate-like material 40 along the parallel direction is not particularly limited, however, any size is applicable as long as it can he compatible with the vacuum suction pad 82. In the example illustrated in FIG. 4, the dimension of the plate-like material 40 along the parallel direction is smaller titan that of the second sheet 134 along the parallel direction. The dimension of the plate-like material 40 along the parallel direction may be equal to or larger than that of the second sheet 134 along the parallel direction. In the example illustrated in FIG. 4, the dimension of the plate-like material 40 along the parallel direction is larger than a distance between the two wire-like transmission members farthest away from each other along the parallel direction. The dimension of the plate-like material 40 along the parallel direction may be equal to or smaller than a distance between the two wire-like transmission members farthest away from each other along the parallel direction.

Both end portions of the plate-like material 40 along the parallel direction do not protrude to an outer side than an outer edge portion of the second sheet 134. One end portion of the plate-like material 40 along the parallel direction may protrude to the outer side than the outer edge portion of the second sheet 134, or both aid portions thereof may protrude to the outer side than the outer edge portion of the second sheet 134.

There is a curved surface curved in a thickness direction in an outer surface of the second sheet 134. The curved surface is a part generated when the first sheet 32 and the second sheet 134 get close to each other from an intermediate portion covering the wire-like transmission member 20 toward an outer edge portion not covering the wire-like transmission member 20 in the fixation of the first sheet 32 and the second sheet 134. The plate-like material 40 has a part covering the curved surface of the second sheet 134. A part of the plate-like material 40 covering the curved surface of the first main surface is separated from the curved surface. Only a pan of the first main surface of the plate-like material 40 has contact with the second sheet 134.

The plate-like material 40 and the second sheet 134 are fixed to each other in a part having contact with each other. A fixing state of the plate-like material 40 and the second sheet 134 is not particularly limited, however, bonding or welding may also be applied.

It is sufficient that a part of the plate-like material 40 which does not have contact with the second sheet 134 also has rigidity with a degree of being able to keep a flat plate-dike shape. For example, the plate-like material 40 may be formed to be harder than the second sheet 134. For example, when the plate-like material 40 and the second sheet 134 are formed of the same material, the thickness of the plate-like material 40 is larger than that of the second sheet 134, thus the plate-like material 40 is formed to be harder than the second sheet 134. A material constituting the plate-like material 40 roe he different from that constituting the second sheet 134. In this case, when the material constituting the plate-like material 40 is harder than that constituting the second sheet 134, the plate-like material 40 may be formed to he harder than the second sheet 134 even when the thickness of the plate-like material 40 is equal to or smaller than that of the second sheet 134. The case where the material is different includes a case where a type of resin as a base is different and a case where a type and a compound ratio of an additive is different even when the type of the resin as the base is the same, for example. That is to say, When the type and the compound ratio of the additive are different even in the case where the resin as the base is the same, the plate-like materials 40 having the same thickness but having hardness different from each other are formed.

In the example illustrated in FIG. 4, the intermediate portion of the plate-like material 40 is fixed to the second sheet 134 along the parallel direction. Both end portions of the plate-like material 40 is not fixed to the second sheet 134 along the parallel direction, and does not have contact therewith. One end portion of the plate-like material 40 may be fixed to the second sheet 134 along the parallel direction. In this case, one end portion of the plate-like material 40 may be located in a position overlapping with the wire-like transmission member 20 along the parallel direction. In this case, the other end portion of the plate-like material 40 may not be fixed to the second sheet 134 along the parallel direction.

A depression may be formed in a portion of the outer surface of the second sheet 134 where the plate-like material 40 is provided. A shape of the depression is not particularly limited as long as the depression can house the plate like material 40, but may be also formed to have a groove-like shape in the manner similar to the depression 38 in the embodiment 1, for example. The plate-like material 40 is housed in the depression, thus the plate-like material 40 is positioned with respect to the second sheet 134. The plate-like material 40 and a bottom portion of the depression have contact with each other, thus a contact area between the plate-like material 40 and the second sheet 134 increases along the parallel direction compared with a case where the plate-like material 40 and the outer surface of the second sheet 134 other than the depression have contact with each other. Even in the case where the plate-like material 40 is provided, an amount of increase in the thickness dimension of the wiring member 110 decreases in the portion where the plate-like material 40.

<Operation Etc.>

When the vacuum suction pad 82 is applied to the planar surface region part 42, the vacuum suction pad 82 has contact with the planar surface region part 42 as illustrated in FIG. 4. At this time, suppressed is a protrusion of the vacuum suction pad 82 from the planar surface region part 42 also in the parallel direction. Accordingly, the planar surface region part 42 and the vacuum suction pad 82 are firmly attached to each other in an airtight state easily, and an air leakage (vacuum leakage) at the time of the vacuum suction is suppressed.

<Effect Etc. of Embodiment 2>

Also according to the wiring member 110, when the vacuum suction pad 82 is applied to the planar surface region part 42, the planar surface region part 42 and the vacuum suction pad 82 are firmly attached to each other in an airtight state easily. Accordingly, the air leakage is suppressed at the time of the vacuum suction, thus the wiring member 110 is easily held by the vacuum suction.

According to the wiring member 110, the outer surface of the plate-like material 40 forms the planar surface region part 42, thus the planar surface region part 42 is easily kept in a planar state. The plate-like material 40 is formed to he harder than the second sheet 134, thus even when the second sheet 134 is bended, the planar surface region part 42 is provided.

Modification Example

Figure 5:
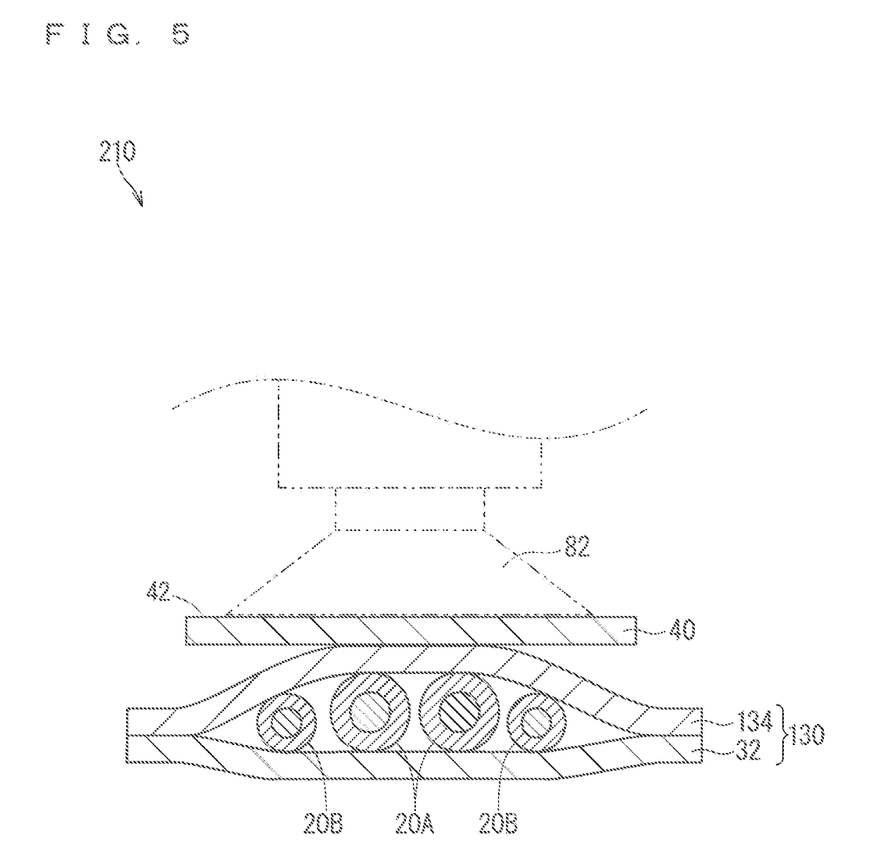
FIG. 5 is a Cross-sectional view illustrating a modification example of the wiring member.

FIG. 5 is a cross-sectional view illustrating a modification example of the wiring member 110.

In a member 210 according to the modification example, the plurality of wire-like transmission members 20 include a first wire-like transmission member 20A and a second wire-like transmission member 20B. The first wire-like transmission member 20A is thicker than the second wire-like transmission member 20B. The wiring member 210 includes the plurality of wire-like transmission members 20 each having an outer diameter different from each other.

Two first wire-like transmission members 20A are included. The number of first wire-like transmission members 20A may he one, or three or more first wire-like transmission member 20A are also applicable. Two second wire-like transmission members 20B are included. The number of second wire-like transmission members 20B may be one, or three or more second wire-like transmission member 20B are also applicable.

The first wire-like transmission member 20A is located on an inner side and the second wire-like transmission member 20B is located on an outer side along the parallel direction. It is also applicable that the second wire-like transmission member 20B is located on an inner side and the first wire-like transmission member 20A is located on an outer side along the parallel direction. The first wire-like transmission member 20A and the second wire-like transmission member 20B may be alternately located along the parallel direction.

There is a curved surface curved in a thickness direction in an outer surface of the second sheet 134. The curved surface includes a portion (referred to as a first curved surface hereinafter) generated when the first sheet 32 and the second sheet 134 get close to each other from an intermediate portion covering the wire-like transmission member 20 toward an edge portion not covering the wire-like transmission member 20 in the fixation of the first sheet 32 and the second sheet 134. The curved surface includes a portion (referred to as a second curved surface hereinafter) generated in accordance with a difference of an outer diameter between the first wire-like transmission member 20A and the second wire-like transmission member 20B. The first curved surface is located in a portion not covering the wire-like transmission member 20, and the second curved surface is located in a portion covering the wire-like transmission member 20.

In the example illustrated in FIG. 5, the first curved surface and the second curved surface are continuously located without a planar surface. There may also be a case where a planar surface is located between the first curved surface and the second curved surface. For example, when the plurality of second wire-like transmission members 20B are arranged in one side portion of the sheet 30, there may be a case where a planar surface is located between the first curved surface and the second curved surface.

A position in the second sheet 134 farthest away from the first sheet 32 along thickness direction is defined as a farthest part. In the example illustrated in FIG. 5, a portion of the second sheet 134 having contact with the first wire-like transmission member 20A is the farthest part. In the example illustrated in FIG. 5, the first curved surface and the second curved surface are located on the same side with respect to the farthest part in one side portion. That is to say, the second sheet 134 is a fixing portion fixed to the first sheet 32 via the second curved surface and the first curved surface from the farthest part. The first curved surface and the second curved surface may be located on opposite sides of the farthest part. For example, when the second wire-like transmission member 20B is located on the inner side and the first wire-like transmission member 20A is located on the outer side along the parallel direction in one side portion of the sheet 30, the first curved surface and the second curved surface may be located on opposite sides of the farthest part. It can also be considered that the first curved surface is located on the outer side of the farthest part and the second curved surface is located on the inner side of the farthest part.

The plate-like material 40 has a portion covering the curved surface of the second sheet 134. A part of the plate-like material 40 covering the curved surface of the first main surface is separated from the curved surface. Only a part of the first main surface of the plate-like material 40 has contact with the second sheet 134.

Also in the wiring member 10 according to the embodiment 1, the plurality of wire-like transmission members 20 may include the first wire-like transmission member 20A and the second wire-like transmission member NB.

Moreover, in the example described above, the wire-like transmission member 20 is fixed to the first sheet 32, and the wire-like transmission member 20 is not fixed to the second sheet 34, however, this configuration is not necessary. It is also applicable that the wire-like transmission member 20 is fixed to the second sheet 34 and the wire-like transmission member 20 is not fixed to the first sheet 32. It is also applicable that the roles of the first sheet 32 and the second sheet 34 are reversed and the planar surface region part 36 is provided on the outer side of the second sheet 34.

The configurations described in the embodiments and notification examples thereof can be appropriately combined as long as they are not contradictory.

EXPLANATION OF REFERENCE SIGNS

10, 110, 210 wiring member
20 wire-like transmission member
20A first wire-like transmission member
20B second wire-like transmission member
22 core wire
24 covering
30, 130 sheet
32 first sheet
14, 134 second sheet
38 depression
40 plate-like material
70 table
80 robot arm
82 vacuum suction pad
A region
C connector

The invention claimed is:

1. A wiring member, comprising:
a plurality of wire-like transmission members; and
a sheet to which the plurality of wire-like transmission members arranged side by side are fixed, wherein
the sheet includes a first sheet covering the plurality of wire-like transmission members from one side and a second sheet covering the plurality of wire-like transmission members from another side, the second sheet is formed to be harder than the first sheet, and
a depression is formed on an outer surface of the second sheet, wherein a bottom surface of the depression forms a planar surface region part provided on an outer side of the second sheet, wherein the depression is a part where a first part of the second sheet along an extension direction of the wire-like transmission members is concaved more than a second part and a third part located on both sides of the first part along the extension direction, wherein the bottom surface is continuously formed from one of the wire-like transmission members on one end side to another one of the wire-like transmission members on another end side along a parallel direction of the plurality of wire-like transmission members,
and wherein
the first sheet forms an exterior surface of the wiring member.

2. The wiring member according to claim 1, wherein the plurality of wire-like transmission members located on an inner side of the planar surface region part have an identical outer diameter.

3. The wiring member according to claim 1, wherein a surface roughness of the planar surface region part is smaller than a surface roughness of a part of the second sheet where the planar surface region part is not located.

4. The wiring member according to claim 1, wherein the planar surface region part is provided in a position exposed in the wiring member in a folded state.

5. The wiring member according to claim 1, wherein the bottom surface is flat along a parallel direction of the plurality of wire-like transmission members.

6. The wiring member according to claim 1, wherein a surface of the second sheet located on a side opposite to the bottom surface and facing the plurality of wire-like transmission members is flat along a parallel direction of the plurality of wire-like transmission members.

7. A wiring member, comprising:
a plurality of wire-like transmission members;
a sheet to which the plurality of wire-like transmission members arranged side by side are fixed, wherein
the sheet includes a first sheet covering the plurality of wire-like transmission members from one side and a second sheet covering the plurality of wire-like transmission members from another side,
a planar surface region part is provided on an outer side of the second sheet; and
a plate-like material provided on an outer surface of the second sheet, wherein
an outer surface of the plate-like material forms the planar surface region part, wherein
an outer edge portion of the second sheet bonded to the first sheet on a side closer to the plurality of wire-like transmission members in relation to an intermediate part of the second sheet covering the plurality of wire-like transmission members is bended to a side of the first sheet, the plate-like material extends to a position facing the outer edge portion from the intermediate part of the second sheet, and the plate-like material and the outer edge portion are located away from each other,
and wherein the plate-like material and the second sheet are both made of a resin material.

8. The wiring member according to claim 7, wherein the plate-like material is formed to be harder than the second sheet.

\* \* \* \* \*